United States Patent [19]
Laibson

[11] Patent Number: 5,385,084
[45] Date of Patent: Jan. 31, 1995

[54] VARIABLE FLOW APPARATUS FOR COOKING FOOD

[76] Inventor: Alan Laibson, 41 N. Griffing Blvd., Asheville, N.C. 28804

[21] Appl. No.: 868,533

[22] Filed: Apr. 14, 1992

[51] Int. Cl.⁶ ............................................. A47J 37/12
[52] U.S. Cl. ........................................ 99/411; 4/508; 99/403; 99/408; 99/410; 137/579
[58] Field of Search ................. 99/330, 357, 403–408, 99/410, 411, 417, 418, 412–416; 137/577, 578, 579; 4/507, 508

[56] References Cited

U.S. PATENT DOCUMENTS

| | | | |
|---|---|---|---|
| 1,138,107 | 5/1915 | Hill | 137/579 |
| 3,097,589 | 7/1963 | Moore | 99/408 |
| 3,266,519 | 8/1966 | Kintzel et al. | 137/579 |
| 3,869,972 | 3/1975 | Chase | 99/410 |
| 3,894,483 | 7/1975 | Anetsberger et al. | 99/331 |
| 3,960,137 | 6/1976 | Schmid | 99/403 |
| 4,574,405 | 3/1986 | Tams | 4/508 |
| 4,621,657 | 11/1986 | St. Ledger | 137/579 |
| 4,945,893 | 8/1990 | Manchester | 99/403 |
| 5,033,369 | 7/1991 | Wu | 99/408 |
| 5,146,843 | 9/1992 | Fuller et al. | 99/403 |

FOREIGN PATENT DOCUMENTS

| | | | |
|---|---|---|---|
| 0251213 | 11/1991 | Japan | 99/403 |
| 0737923 | 5/1980 | U.S.S.R. | 137/579 |

Primary Examiner—Timothy F. Simone
Attorney, Agent, or Firm—Carter & Schnedler

[57] ABSTRACT

There is provided an apparatus for cooking foods such as pasta. The apparatus includes a container which receives an amount of water to be heated. A cooking basket is partially submerged in the water inside the container. A drain pipe having a 90° elbow is received in the container. Portions of the drain pipe extend through an opening in the side wall of the container so as to continuously drain water from the container. The drain pipe is rotatable so that the water drain rate may be varied. The drain pipe is held in position until it is rotated again.

12 Claims, 6 Drawing Sheets

VARIABLE FLOW APPARATUS FOR COOKING FOOD

BACKGROUND OF THE INVENTION

This invention relates to cooking apparatus and methods for cooking. More particularly, it relates to methods and apparatus for cooking pasta.

For many years, pasta has been cooked in a basket which is at least partially submerged in a pot containing water. The pot is received directly over the burner of the stove.

After a batch of pasta is cooked, it is desirable to remove the starch enriched portion of the water from the cooking container. Since the starch is lighter than water, it will tend to float on the top of the water. Using the prior art pasta-cooking apparatus, cooks often used a cup to skim the pasta starch from the top of the water or simply removed the pot from the burner and poured the hot water out into a sink. This technique often results in the spillage of very hot water causing burns to the cook as well as causing the floor to become slippery. Furthermore, this technique of removing the starch from the water is labor intensive, taking the cook away from his or her other duties.

There is currently on the market electronic pasta cookers which continuously and automatically change the water in the cooker. However, this type of cooker is very expensive and, in addition, takes up a great deal of space in the kitchen. It is therefore desirable to provide a pasta cooker which continuously drains the starch enriched water and adds fresh water and which is inexpensive and which may be utilized on a burner of an ordinary kitchen stove.

OBJECTS OF THE INVENTION

It is therefore one object of this invention to provide an improved method and apparatus for cooking food.

It is another object to provide an improved method and apparatus for cooking pasta whereby the cooking water is continuously replenished and the old water is drained.

It is another object of this invention to provide an improved pasta cooker which is inexpensive and is easy to operate and to maintain.

It is another object of this invention to provide a pasta cooker having continuous fresh water which may be utilized on an ordinary stove and which does not take up a great deal of space in the kitchen and is portable.

It is another object of this invention to provide a pasta cooker which permits a fresh clean supply of water to come in contact with the pasta at all times.

SUMMARY OF THE INVENTION

In accordance with one form of this invention there is provided a cooking apparatus which includes a container which holds an amount of water for cooking foods such as pasta when the container and thus the water is heated. A mechanism is provided for draining water in the container. A mechanism is further provided for varying the rate of discharge of the water through the drain and out of the container.

It is preferred that the mechanism for varying the rate of drainage includes a drain pipe which is located inside of the container and which is adapted to rotate so that the elevation of the opening in the drain pipe may be changed so that the cook or user may vary the drain rate.

It is further preferred that a mechanism be provided for holding the drain pipe in its desired position. Preferably, this mechanism for holding includes at least one O-ring which is attached to a nipple-forming part of the drain pipe and which interfaces with a discharge pipe. Alternatively, a ratchet type system may be provided so that the drain pipe may be held in discrete positions.

In accordance with another form of this invention, there is provided a method for providing a fresh clean supply of water which contacts food, such as pasta, in a cooker. The cooker includes a drain pipe having an opening therein. The method includes steps of: causing the water to flow into the cooker; positioning the drain pipe relative to the height of the water so that a predetermined discharge rate of the water is maintained; holding the drain pipe in the position which has been determined; heating the cooker and thus the water, thereby cooking the food; and permitting waste in water from the cooked food to flow through the drain pipe and thus out of the cooker.

BRIEF DESCRIPTION OF THE DRAWINGS

The subject matter which is regarded as the invention is set forth in the appended claims. The invention itself, however, together with further objects and advantages thereof, may be further understood in reference to the accompanying description taken in conjunction with the accompanying drawings in which:

DESCRIPTION OF THE PREFERRED EMBODIMENTS

Figure 1:
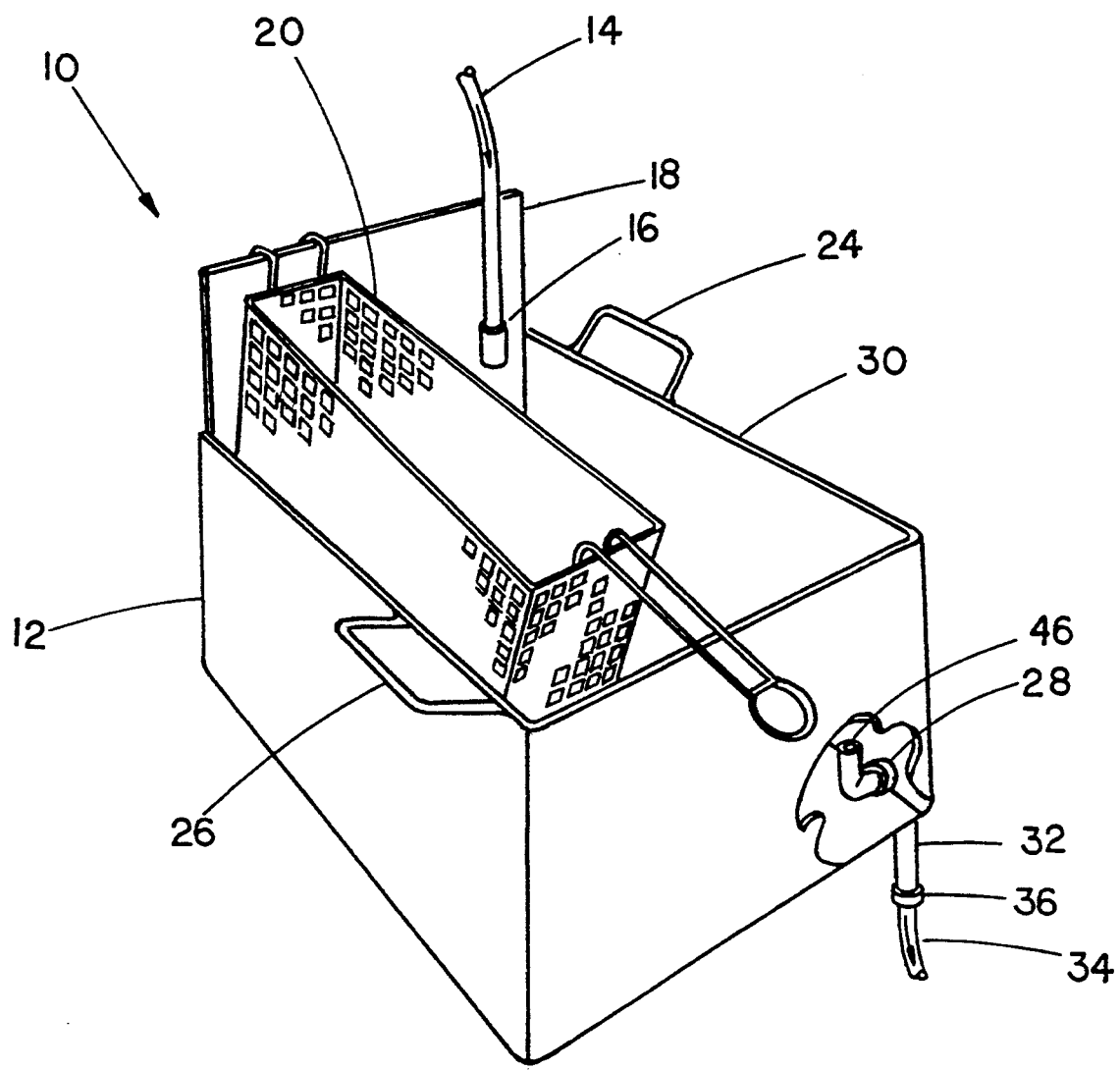
FIG. 1 is a pictorial view showing the apparatus of the subject invention.
Figure 2:
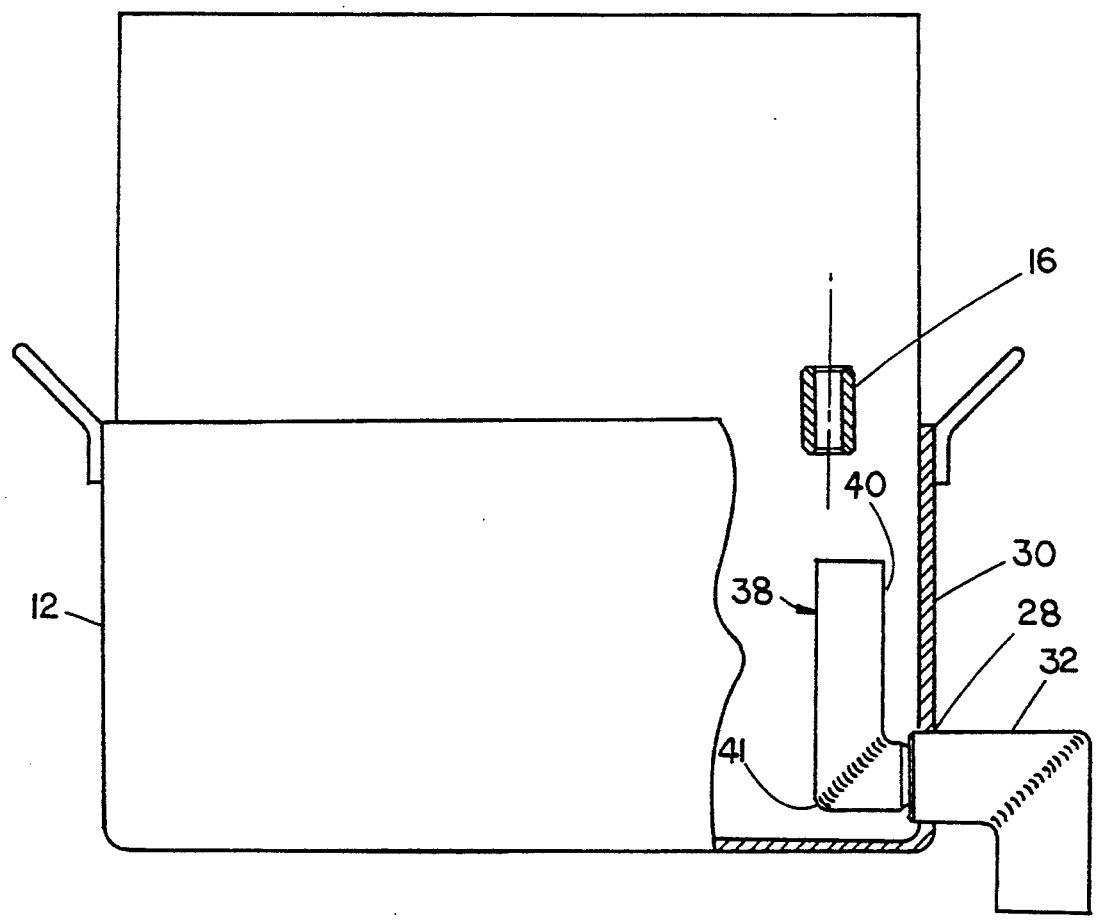
FIG. 2 is a front elevational view with portions removed showing the apparatus of FIG. 1 without the cooking basket and with portions of the front wall removed.
Figure 3:
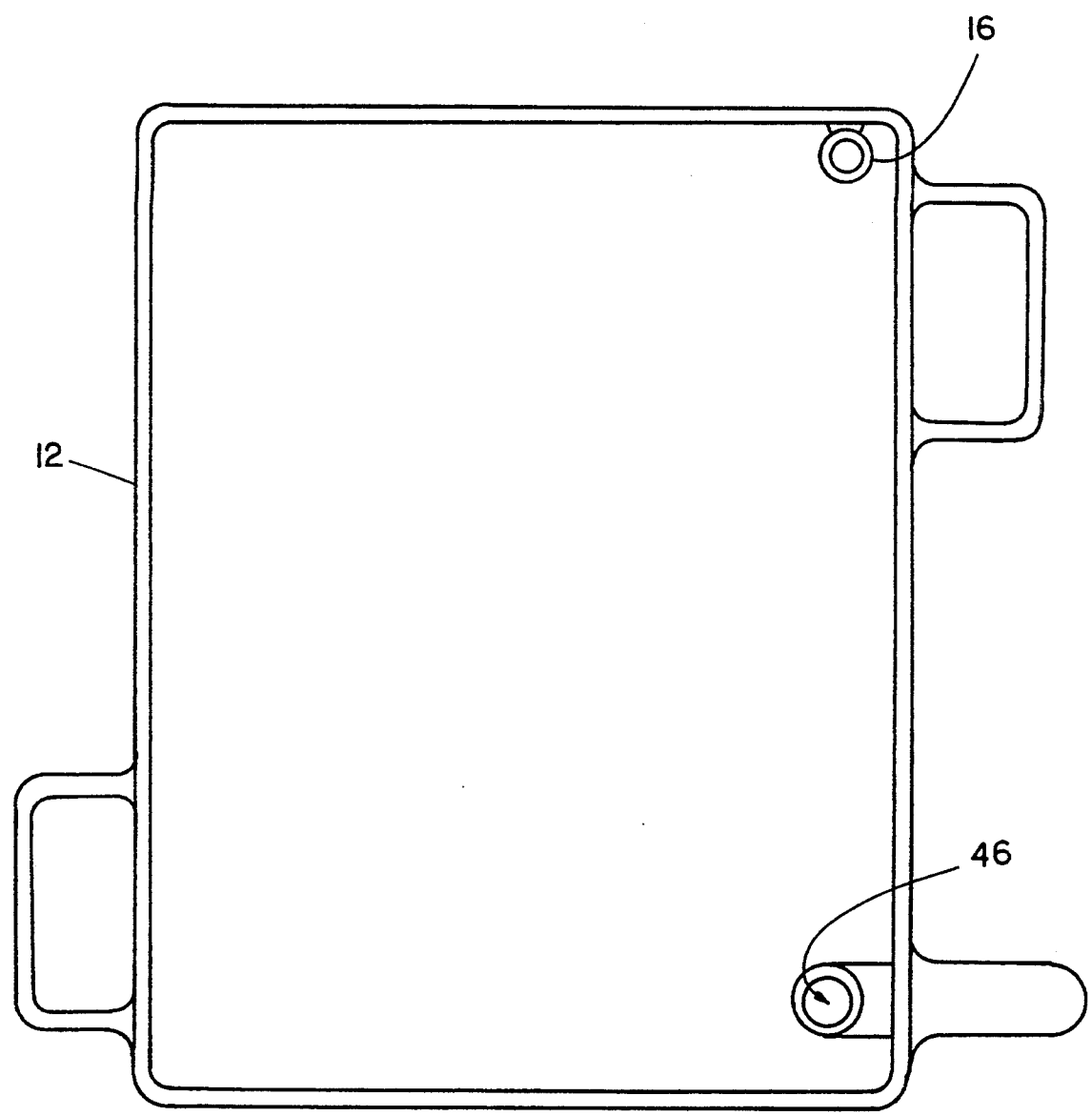
FIG. 3 is top plan view of the apparatus of FIG. 1 with cooking basket removed.

Referring now more particularly to FIGS. 1 through 8, there is provided pasta cooker 10 including container 12 which is adapted to receive an amount of water for cooking pasta. Preferably the cooking apparatus is made of stainless steel. The water is normally placed in container 12 through a water inlet line 14 which is coupled to hose guide 16 which is attached to the back wall 18 of container 12. Water line 14 may be a PVC nylon reinforced flexible hose. A standard pasta cooker cage is normally hung on the back wall 18 and is filled with pasta (not shown) which becomes submerged in the water within the container. Container 12 is adapted to be received over an ordinary single stove burner 13 for heating the water.

Figure 4:
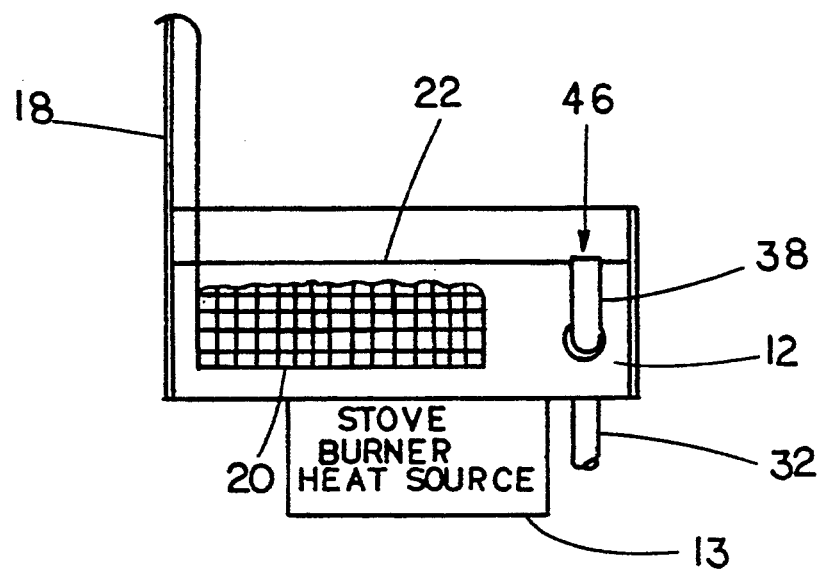
FIG. 4 is a partial side elevational view of the apparatus of FIG. 1, having portions removed for clarity and showing the drain pipe in the upright position with its opening near the surface of the water.
Figure 5:
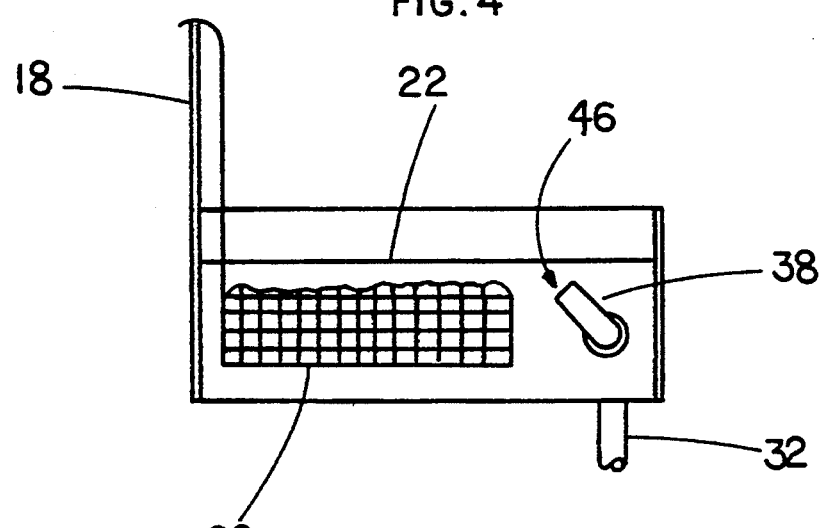
FIG. 5 is the same view as FIG. 4, however the drain pipe has been rotated so its opening is below the level of water for faster draining.
Figure 6:
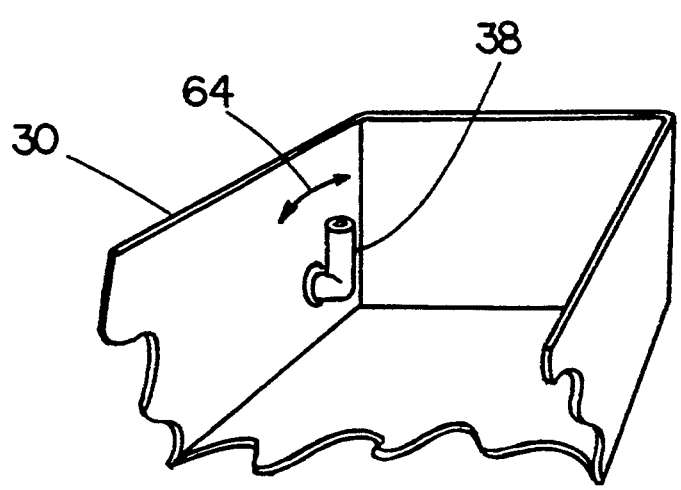
FIG. 6 is a partial pictorial view of the apparatus of FIG. 1 illustrating the rotation of the drain pipe.

The top surface of the water is indicated as 22 in FIGS. 4 and 5. The pasta cooker 10 includes handles 24 and 26 to make the pasta cooker more portable. There is a hole 28 through wall 30 of container 12. A discharge pipe 32 is received in hole 28 and is welded to the periphery surfaces of the hole. Discharge pipe 32 is L-shaped and may be connected to drain hose 34 through connector 36, or it may be simply aligned with a funnel (not shown). The drain hose may also be a PVC nylon reinforced flexible hose.

The pasta cooker also includes drain pipe 38. Drain pipe 38 is L-shaped having opening 46 for receiving water nipple 43 in the embodiment of FIG. 7 and nipple 44 in the embodiment of FIG. 8. The nipple is located at the opposite end of the drain pipe from opening 46. Elbow 41 generally separates the submerged portion 40 of the drain pipe 38 from the nipple portion 43. Opening 46 of drain pipe 38 permits water to drain therethrough at a rate depending on its position which will be explained in more detail below.

Figure 7:
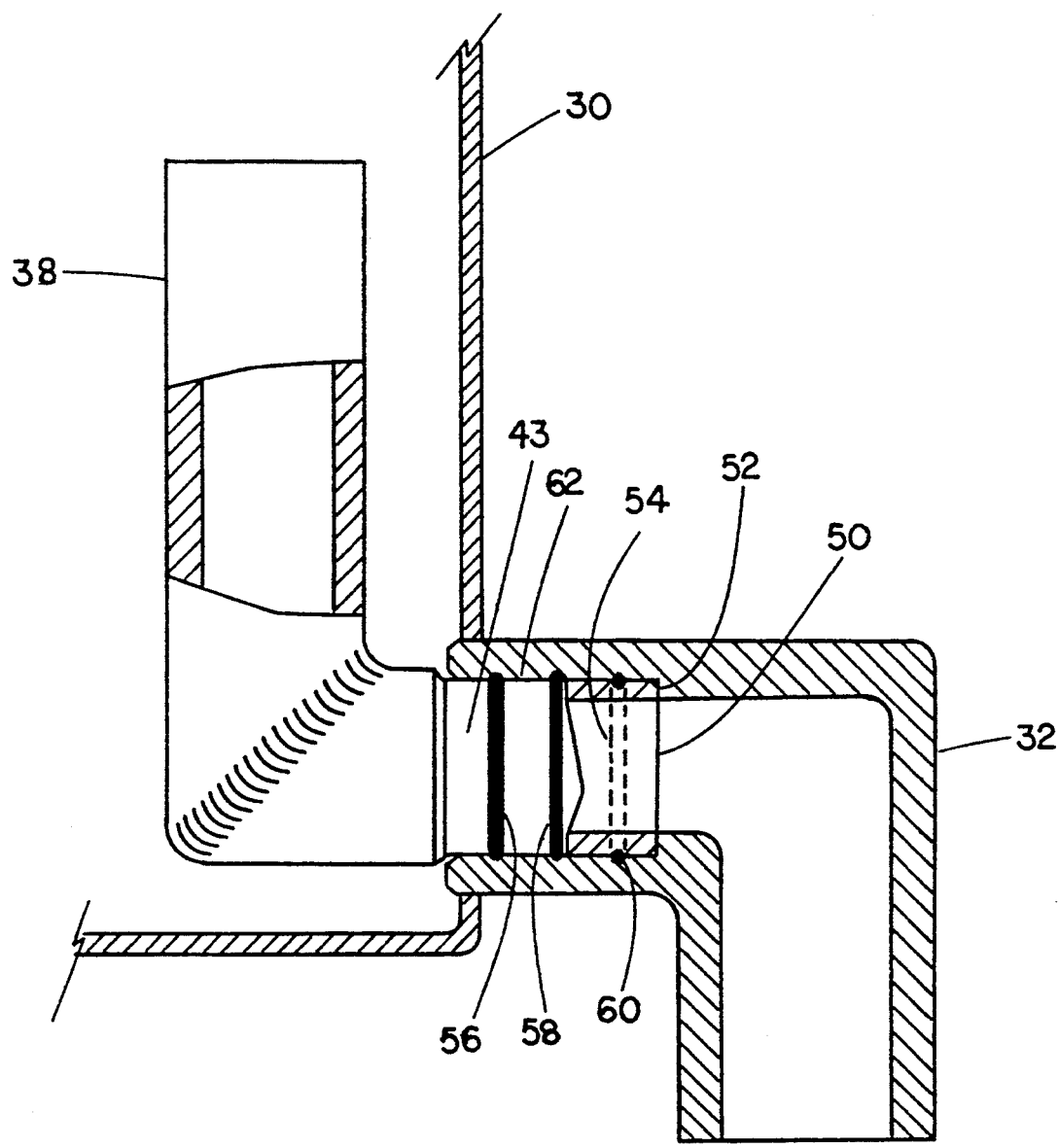
FIG. 7 is a sectional view of drain pipe and discharge pipe shown in FIG. 2 utilizing one embodiment of the invention.

Referring now to FIG. 7, nipple 43 of drain pipe 38 is received inside of discharge pipe 32. The end 50 of nipple 43 abuts against shoulder 52 located inside the discharge pipe. Nipple 43 includes three grooves 54 about the outer periphery surface thereof. For illustration purposes, only one of the grooves 54 is shown. Resilient O-rings 56, 58 and 60 are received in the three grooves 54. When the nipple 43 is pressed into the discharge pipe, the O-rings rest against the inside wall 62 of the discharge pipe, thereby providing a watertight seal. More importantly, however, the O-rings 56, 58 and 60 enable drain pipe 38 to be rotated, as indicated by arrows 64 shown in FIG. 6, so that the drain rate of the water container 12 may be varied. By using these resilient O-rings, the position of the drain pipe and thus the elevation of opening 46 may be established such as shown in FIGS. 4 and 5. The position of the drain pipe is maintained in place by the O-rings until the user wants to change the position, and thus the water drain rate, by again rotating the drain pipe. In order to rotate the drain pipe, sufficient rotational force must be applied to overcome the frictional force of the O-rings and the inside surfaces of the discharge pipe. Normally the drain pipe must be rotated using a utensil such as a tong or other implement which is available in the kitchen because the water in the container is normally very hot.

Figure 8:
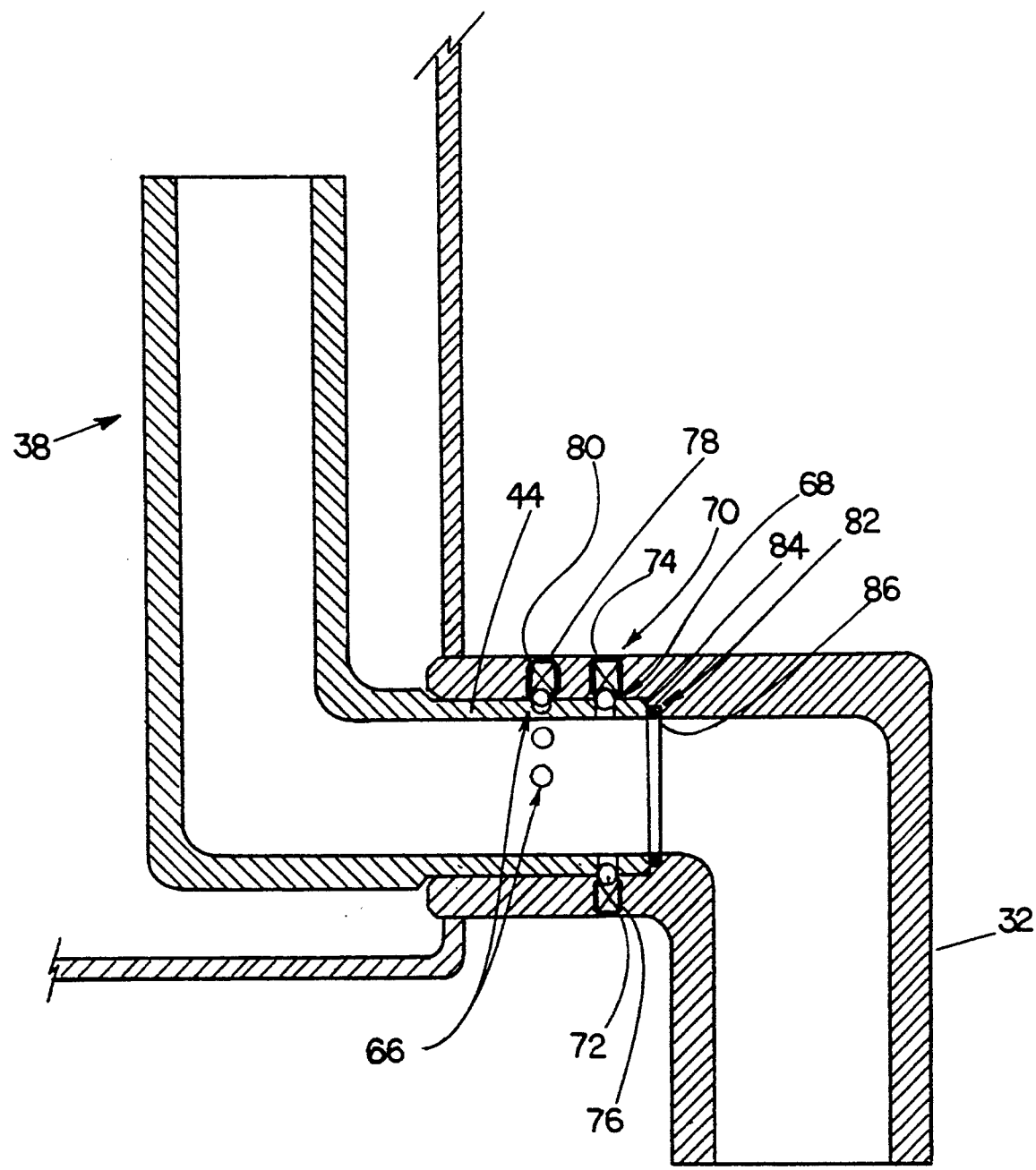
FIG. 8 is a sectional view of the drain pipe and discharge pipe shown in FIG. 2 showing another embodiment of the invention.

FIG. 8 shows an alternative embodiment to that of FIG. 7. In FIG. 8, nipple 44 includes a plurality of shallow holes 66 drilled therein in a line about the outer peripheral surface of the nipple. In addition, a channel 68 is cut about the outer peripheral surface of the nipple 44 adjacent to the aligned holes 66. A pair of spring-loaded ball plungers 70 and 72, which are commercially available and are known to those skilled in the art, are received in recesses 74 and 76 in the inside wall of the discharge pipe. The balls, which form part of the ball plungers 72 and 74, are in contact with groove 68. In addition, there is a ball plunger 78 of the type referred to above, received in recess 80 of the discharge pipe. A portion of the ball plunger 78 is selectively received in holes 66 which stabilize the portion of the drain pipe while permitting it to be rotated when sufficient rotational force is applied to overcome the spring tension. Thus, the drain pipe 38 may be rotated and held in discrete positions utilizing the ball plunger and hole arrangement. O-ring 82 abuts against the end 84 of the nipple and against shoulder 86 of discharge pipe 32, thereby providing a water seal.

As can be seen from FIG. 4, when the rotatable drain pipe 38 is positioned in its upright position its opening 46 will somewhat align with the top surface 22 of the water in the container, thereby slowly draining the water from the container. However, when the drain pipe 38 is rotated as shown in FIG. 5, opening 46 is submerged and the water from the container is drained rapidly. Using the embodiments of either FIGS. 7 or 8, drain pipe 38 may be set in many positions to fine tune the rate of discharge of the water from the container depending on the needs of the cook. Thus, the cook is able to cause a fresh clean supply of water to come in contact with the pasta at all times, thereby providing a high quality of cooked pasta. The drain pipe opening is normally placed at a height so as to permit the incoming water to move across the cooking pasta to carry away the starch enriched waters to move out the drain. Because the starch is lighter in water, it moves toward the surface where it is carried to the top of the drain pipe and skimmed out.

Using this apparatus, the cook may rotate the drain pipe toward the bottom of the container to permit one to make a rapid partial discharge of water without having to manually dip out the water or, worse, having to carry the container to the sink for draining. By eliminating the need to empty or dip out the water, one greatly reduces the possibility of burns. In addition, this cooking apparatus is always ready to use once the water is boiling. There is no reason to carry the container off line to empty and refill it for future use. The apparatus permits the drain pipe to rotate at least a full 90° or more to permit complete draining of the container without the inherent dangers set forth above. Furthermore, starch buildup is prevented and a superior pasta product is provided without the need to purchase expensive electronic equipment. In addition, this apparatus may be used on a single burner of an ordinary stove and is easy to hook up to fresh water sources and to the water drain.

From the foregoing description of the preferred embodiments of the invention, it will be apparent that many modifications may be made therein. It is understood that all such modifications which are embodied in the accompanying claims come within the true spirit and scope of this invention.

I claim:

1. A portable pasta cooking apparatus comprising:
   a cooking container; said cooking container having a bottom wall and at least one side wall rising vertically from said bottom wall; said cooking container for holding an amount of water for cooking foods when heated; said bottom wall for making contact with a source of heat to transfer the heat from the outside to the inside of said cooking container;
   a drain pipe for draining water from said cooking container; a substantial portion of said drain pipe located inside of said cooking container; an opening in at least one of said side walls in said cooking container; said drain pipe communicating with said opening; said drain pipe including an open end; said drain pipe being rotatable whereby the elevation of said open end with respect to the level of the water in said cooking container may be varied;
   a mechanism for selectively holding said drain pipe in a plurality of predetermined positions whereby the rate that the water is drained from the cooking container may be varied;

means to enable said cooking apparatus to be readily transported; said cooking container being devoid of a heat source.

2. An apparatus as set forth in claim 1, further including a discharge pipe; said discharge pipe affixed to said container and communicating with said opening; said drain pipe having a nipple end; said nipple end of said drain pipe received in a portion of said discharge pipe.

3. An apparatus as set forth in claim 2, wherein said mechanism for holding includes at least one O-ring received about said nipple end and contacting discharge pipe; said O-ring holding said drain pipe in a selective predetermined position and preventing water leaks.

4. An apparatus as set forth in claim 3, wherein said O-ring is made of a resilient material.

5. An apparatus as set forth in claim 3, further including a plurality of grooves in said nipple; a plurality of O-rings received in said grooves.

6. An apparatus as set forth in claim 2, further including a plurality of aligned holes in said nipple; at least one spring loaded ball plunger received in the wall of said discharge pipe; the ball in said plunger contacting one of said holes thereby holding said drain pipe in a predetermined position.

7. An apparatus as set forth in claim 6, further including a groove in said nipple; at least a second spring loaded ball plunger received in the wall of said discharge pipe; the ball in said second ball plunger contacting said groove; means for sealing the connection between said nipple and said discharge pipe.

8. An apparatus as set forth in claim 7, wherein said means for sealing is an O-ring contacting the end of said nipple and the inside of said discharge pipe.

9. An apparatus as set forth in claim 1, further including a basket; the pasta received in said basket; part of said basket adapted to be below the water level.

10. An apparatus as set forth in claim 1, wherein said drain pipe includes a 90° bend; said drain pipe enables to be rotated between vertical and horizontal positions.

11. A portable pasta cooking apparatus comprising:
a cooking container for receiving water; said cooking container having four side walls and a bottom wall; said bottom wall for making contact with a source of heat to transfer the heat from the outside to the inside of said cooking container; an opening in one of said side walls;

a discharge pipe attached to said opening;

an L-shaped drain pipe; said L-shaped drain pipe having an open end and a nipple end; said nipple end rotatably received inside of said discharge pipe through said opening in said side wall;

a mechanism for selectively maintaining said drain pipe in any one of a plurality of predetermined positions; said mechanism for maintaining being in contact with said nipple and said discharge pipe whereby the drainage rate of the water in said cooking container may be varied;

means to enable said cooking apparatus to be readily transportable; said cooking container being devoid of a heat source.

12. An apparatus as set forth in claim 11 wherein one of said side walls is higher than the other three side walls; a cooking basket removably attached to said high side wall; connection means affixed to said high side wall; said connection means for attaching a fresh water source to said cooking apparatus.

* * * * *